(12) United States Patent
Fries et al.

(10) Patent No.: US 6,579,045 B1
(45) Date of Patent: Jun. 17, 2003

(54) TOOL COMPONENT

(76) Inventors: Robert Fries, 4 Birnam Road, Forest Town, 2193 (ZA); Johnny Lai Sang, 8 Matabele Road, Northcliff, 2115 (ZA); Obakeng Bibian Mogale, 11 Minida Mansions, 79 Yeo Street, Yeoville, 2198 (ZA); Iacovos Sigalas, 112 Third Street, Linden, 2195 (ZA)

( * ) Notice: Subject to any disclaimer, the term of this patent is extended or adjusted under 35 U.S.C. 154(b) by 0 days.

(21) Appl. No.: 09/806,943

(22) PCT Filed: Oct. 8, 1999

(86) PCT No.: PCT/IB99/01647

§ 371 (c)(1),
(2), (4) Date: May 2, 2001

(87) PCT Pub. No.: WO00/20149

PCT Pub. Date: Apr. 13, 2000

(30) Foreign Application Priority Data

Oct. 8, 1998 (ZA) .............................. 98/9195

(51) Int. Cl.[7] ........................... B23P 15/28; B26D 1/00; B26D 3/00
(52) U.S. Cl. ....................... 407/118; 407/119
(58) Field of Search ................ 407/118, 119

(56) References Cited

U.S. PATENT DOCUMENTS 4,239,502 A 12/1980 Slack et al.
5,492,188 A 2/1996 Smith et al.
5,633,087 A * 5/1997 Simpson ............... 428/408
5,697,994 A * 12/1997 Packer et al. ............ 51/309

FOREIGN PATENT DOCUMENTS

| DE | 43 41 503 | 6/1995 |
| EP | 0 322 214 | 6/1989 |
| EP | 0 738 553 | 10/1996 |
| EP | 0 744 242 | 11/1996 |
| EP | 0 868 957 | 10/1998 |

* cited by examiner

Primary Examiner—Derris H. Banks
Assistant Examiner—Ali F Abdelwahed
(74) Attorney, Agent, or Firm—Oblon, Spivak, McClelland, Maier & Neustadt, P.C.

(57) ABSTRACT

A tool component comprising an abrasive element presenting a cutting edge or point and a thermally conductive element having a thermal conductivity greater than the thermal conductivity of the abrasive element, wherein the thermally conductive element is in thermal contact with the abrasive element so as to conduct heat generated at the cutting edge or point away from such cutting edge or point. The thermally conductive element may be bonded to a substrate. The abrasive element may be PCBN and the thermally conductive element may be either CVD diamond or PCD or else the abrasive element may be PCD and the thermally conductive element may be CVD diamond.

30 Claims, 2 Drawing Sheets

TOOL COMPONENT

BACKGROUND OF THE INVENTION

This invention relates to a tool component and more particularly a tool component for a cutting tool.

The high speed turning of difficult-to-machine materials such as nodular cast irons, steels and iron-, cobalt- or nickel-based superalloys is an important industry. These materials contain iron, nickel or cobalt and have in common that they develop high machining temperatures even at moderate cutting speeds. Thus, thermally activated processes such as adhesion, diffusion or chemical reactions contribute significantly to overall wear of a cutting edge used to turn these materials. Furthermore, the materials have an intrinsic high hardness or are work hardened during machining, or contain hard particles requiring tool materials which have an appreciable hot-hardness characteristic.

PCD (polycrystalline diamond) cannot be used due to the high affinity of carbon with iron, cobalt and nickel based materials which leads to rapid tool degradation once cutting temperatures of 600–700° C. are exceeded.

Tungsten carbide is only suitable at low cutting speeds since it has a high reactivity with iron, cobalt and nickel and begins to soften at machining temperatures around 700–800° C.

Other ceramic cutting tools have a better hot-hardness than tungsten carbide and can be chemically stable. Alumina-based tools are the most chemically stable materials but they exhibit low thermal conductivity and a relatively poor thermal shock resistance. $Si_3N_4$ and Sialon-based tools have a better thermal conductivity and thermal shock resistance but are less chemically stable. Another limiting factor of ceramic cutting tools is their intrinsic brittleness.

PCBN (polycrystalline CBN) is probably the most suitable existing tool material to machine the above difficult-to-machine materials. It is more chemically stable than diamond in combination with the identified workpieces and also has a high abrasion resistance up to high machining temperatures. However, even PCBN tools fail at high speeds through thermally activated chemical wear.

A certain improvement in the wear resistance of carbide and PCBN when machining ferrous difficult-to-machine materials has been achieved by applying thin chemically inert coatings made of materials such as TiN, $Al_2O_3$, HfN, TiAlN and the like. Such coatings act as a diffusion barrier and reduce tool dissolution into the workpiece. However, these coatings principally address crater wear at the tool-chip interface and help little in reducing, flank wear.

SUMMARY OF THE INVENTION

According to the present invention, a tool component comprises an abrasive element presenting a cutting edge or point and a thermally conductive element having a thermal conductivity greater than that of the abrasive element in thermal contact with the abrasive element so as to conduct heat generated at the cutting edge or point away from such edge or point.

The thermally conductive element will have a high thermal conductivity, preferably exceeding 120 W/m.° K. The use of a thermally conductive element ensures that heat generated at the cutting edge or point is conducted away from that edge or point as rapidly as possible. The thermally conductive element may be in thermal contact with a larger body of another material of high thermal conductivity.

The abrasive element may be PCBN, ceramic, PCD or CVD diamond. Examples of suitable ceramic materials are carbides, nitrides, borides, oxides or silicides of metals of Group IVb, Vb, or VIb. Also suitable as ceramics are silicon carbide, silicon nitride or an oxide, boride or nitride of aluminium. The preferred ceramic materials are alumina, aluminium carbide, titanium carbide, titanium nitride and silicon nitride.

The thermal conductivity to the thermally conductive element will be greater than that of the abrasive element. Thus, in the case of the abrasive element being PCBN, the thermally conductive element may be CVD diamond or PCD. Further, when the abrasive element is PCD, the thermally conductive element may be CVD diamond, single crystal or polycrystalline.

In the tool component of the invention, the thermally conductive element may be a layer in thermal contact with a surface of the abrasive element. In one form of the invention, the abrasive element has a surface leading to a cutting edge or point and the thermally conductive element is bonded to that surface. In another form of the invention, the abrasive element has a surface leading to the cutting edge or point and an opposite surface and the thermally conductive element is bonded to the opposite surface. In these forms of the invention, the abrasive element and the thermally conductive element will generally both have a layer form.

The abrasive element may also form an insert located in a recess in the thermally conductive element.

The thermally conductive element may be uniform in composition, or have regions differing in thermal conductivity. When the regions differ in thermal conductivity, the regions may increase in thermal conductivity away from the abrasive element. The regions differing in thermal conductivity may also be alternating regions. Such regions may be regions of a material having a thermal conductivity greater than that of the abrasive element which alternate with regions of a material having the same or lower thermal conductivity than that of the abrasive element. The alternating regions may be in strip form or in spiral or concentric ring form.

The tool component of the invention may be bonded to a substrate such as a cemented carbide substrate. The cemented carbide substrate will typically be a tungsten carbide substrate. The thermally conductive element will generally be sandwiched between the abrasive element and the substrate.

The invention further provides a method of cutting or turning a material including the steps of providing a cutting edge or point of a tool component as described above, causing relative movement between the cutting point or edge and the material and advancing the cutting edge or point into the material. The advancement of the cutting edge or point into the workpiece can be achieved by moving either the workpiece, the cutting edge or point, or both. This method has particular application to the cutting of materials containing iron, nickel, or cobalt with PCBN or ceramic.

DESCRIPTION OF EMBODIMENTS

When the abrasive layer is a PCBN layer, it will generally consist of a polycrystalline mass of CBN particles and a refractory binder phase. The refractory binder phase may, include carbides, nitrides, borides oxides or silicides of metals of group IVb, Vb, VIb, silicon carbide, silicon nitride or aluminium oxide, boride or nitride. The preferred binder phase materials are carbides, nitrides and carbonitrides of titanium, zirconium and hafnium.

Examples of suitable PCBN materials are those sold under the trademarks Amborite® and DBC50®.

When the thermally conductive element takes the form of a layer, particularly when that layer is diamond or a diamond-containing material, it can be as thin as a few nanometers, e.g. 100 nanometers. The thicker the layer, the quicker the heat is removed from the cutting point or edge and the lower the machining temperature of that edge or point.

When the abrasive element is in the form of a layer, the thickness thereof will be governed by the intended mode to operation. i.e. whether roughing or finishing is desired, and the associated maximum permissible wear scar width. Thinner layers than currently available tool components are possible.

The particle size used in the abrasive element will depend on the specifics of the intended operation and the workpiece material. For example, in the case of a PCBN layer, for a finishing operation, fine grain CBN particles, typically smaller than 2 μm, will be used, whereas for a roughing operation with high material removal rate, coarser CBN particles will be used.

Figure 1:
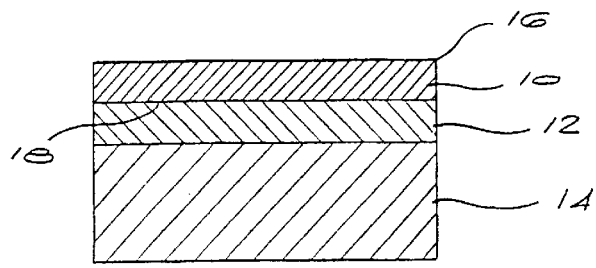
FIG. 1 is a sectional side view of a first embodiment of a tool component of the invention.

Embodiments of the invention will now be described with reference to the accompanying drawings. Referring first to FIG. 1, there is shown a tool component for use in cutting or turning a material. The component comprises an abrasive layer 10 bonded to a layer 12 of high thermal conductivity which itself is bonded to a substrate 14. The component may have any suitable shape, in plan, such as circular, square, rectangular, and the like. The edge 16 of the abrasive layer 10 provides the cutting edge for the component. In use, heat generated at the cutting edge, during use, is rapidly conducted away therefrom by virtue of the layer 12.

In one specific form of this embodiment, the abrasive layer 10 may be PCBN, the layer 12 may be PCD or CVD diamond and the substrate 14 may be cemented carbide.

Figure 2:
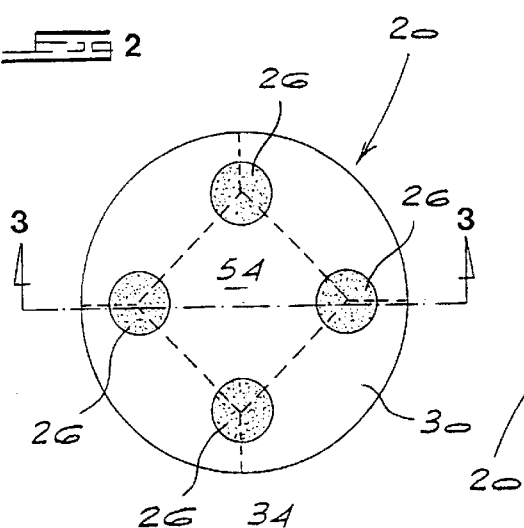
FIG. 2 is a plan view of a second embodiment of the invention.
Figure 3:
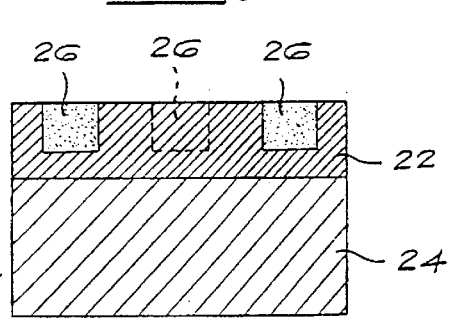
FIG. 3 is a view along the line 3—3 of FIG. 2.
Figure 4:
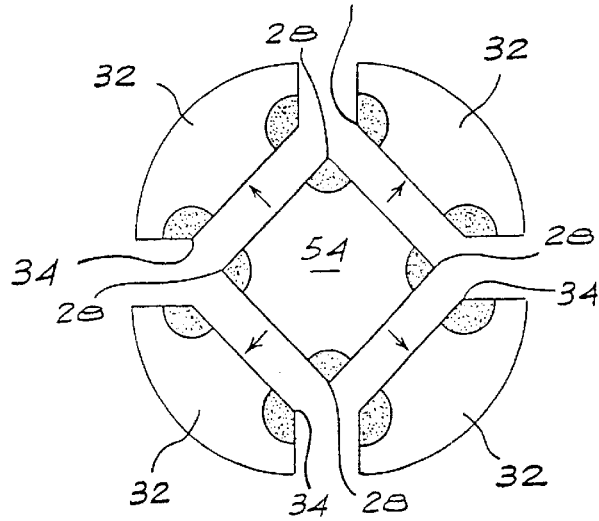
FIG. 4 is an exploded view of FIG. 2.

A second embodiment of the invention is illustrated by FIGS. 2 to 4. Referring to these figures a unit or body 20 is produced in which a layer 22 of a material of high thermal conductivity is bonded to a substrate 24. The layer has four abrasive inserts 26 located therein. In this form of the invention, the inserts 26 will typically be PCBN, the layer 22 PCD and the substrate 24 cemented carbide.

A tool component is produced from the unit 20 by cutting, e.g. using EDM cutting, the unit as illustrated by the dotted lines in FIG. 2. A square-shaped tool component 54 is produced which presents a cutting edge 28 on each corner thereof (see FIG. 4). The hollow off-cut 30 which remains can itself be severed further to produce a number of tool components 32 in the manner shown in FIG. 4. Each of these components presents cutting points 34.

The layer 12 may comprise more than one region. For example, the region at the interface 18 may comprise a mixture of the material of the abrasive layer 10 and the material of the thermally conductive layer 12. Such a region will assist in reducing thermal mismatch at the interface 18.

Figure 5:
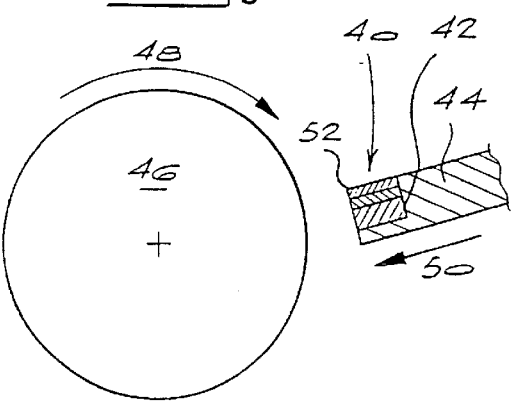
FIG. 5 is a schematic view of a tool component cutting a workpiece.

The tool component of FIG. 1 may be mounted in a tool and used to turn or cut a workpiece in a manner illustrated schematically by FIG. 5. Referring to this figure, the tool component 40 FIG. 1 is bonded in a recess 42 provided in a tool 44. A workpiece 46 is provided and is rotated in the direction of arrow 48. The tool is then advanced into the workpiece in a direction of arrow 50 such that the cutting edge 52 is advanced into the workpiece 46 to effect the cut.

Figure 6:
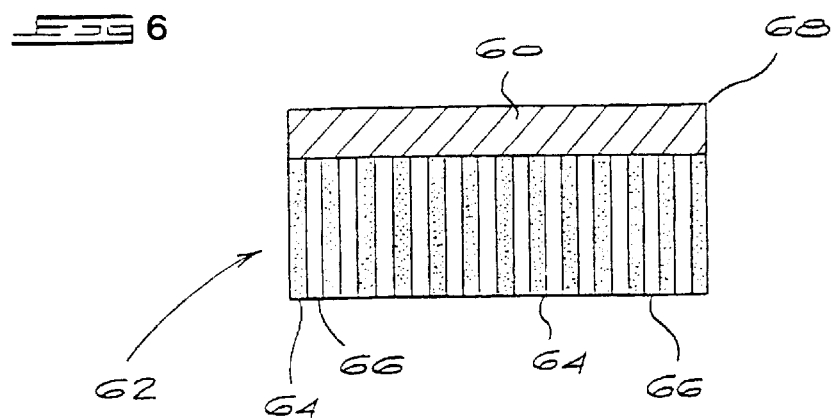
FIG. 6 is a sectional side view of a further embodiment of the invention.

A further embodiment of the invention is illustrated by FIG. 6. Referring to this Figure, a tool component for use in cutting or turning the material comprises an abrasive layer 60 bonded to a thermally conductive element 62. The thermally conductive element 62 comprises alternating strips 64 of a material having a thermal conductivity greater than that of the abrasive layer and strips 66 of a material having a thermal conductivity the same or lower than that of the abrasive layer. The abrasive layer 60 has a cutting edge 68.

Figure 7:
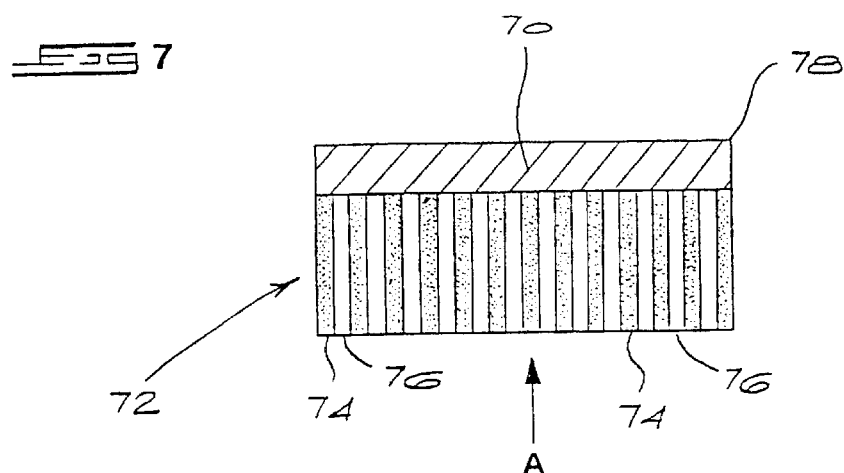
FIG. 7 is a sectional side view of a further embodiment of the invention.
Figure 8:
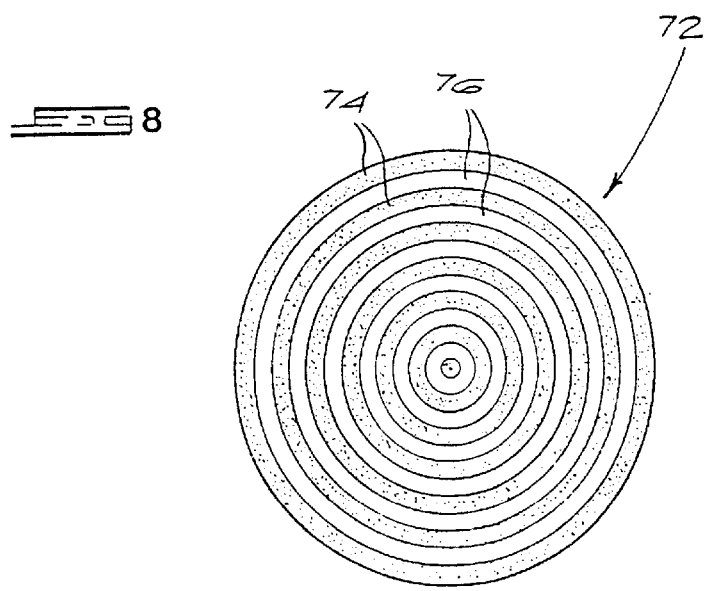
FIG. 8 is a view of FIG. 7 in the direction of arrow A.

A further embodiment of the invention is illustrated by FIGS. 7 and 8. Referring to these Figures, a tool component comprises an abrasive layer 70 bonded to a thermally conductive element 72. The abrasive layer 70 has a cutting edge 78. The thermally conductive element 72 comprises alternating regions 74 of a material having a thermal conductivity greater than that of the abrasive element and regions 76 of a material having a thermal conductivity the same or lower than that of the abrasive layer 70. As can be seen from FIG. 8, the regions 74, 76 take a concentric ring form. The regions 74, 76 can also take a spiral form.

In the embodiments of FIGS. 6 to 8, the elements 62, 72 have a thermal conductivity greater than that of the abrasive layers 60, 70.

What is claimed is:

1. A tool component comprising:
    an abrasive element presenting a cutting edge or point; and
    a thermally conductive element having a thermal conductivity greater than a thermal conductivity of the abrasive element, the thermally conductive element being in thermal contact with the abrasive element so as to conduct heat generated at the cutting edge or point away from the cutting edge or point, wherein the abrasive element is PCBN and the thermally conductive element is either CVD diamond or PCD.

2. The tool component according to claim 1, wherein the thermal conductivity of the thermally conductive element exceeds 120 W/m.° K.

3. The tool component according to claim 1, wherein the thermally conductive element is a layer in thermal contact with a surface of the abrasive element.

4. The tool component according to claim 3, wherein the abrasive element has a surface leading to the cutting edge or point and the thermally conductive element is bonded to the surface of the abrasive element leading away from the cutting edge or point.

5. The tool component according to claim 3, wherein the abrasive element has a first surface leading to the cutting edge or point and a second surface which is opposite the first surface and the thermally conductive element is bonded to the second surface of the abrasive element.

6. The tool component according to claim 3, wherein the abrasive element and thermally conductive element both have a layer form.

7. The tool component according to claim 1, wherein the abrasive element is an insert located in a recess in the thermally conductive element.

8. The tool component according to claim 1, wherein the thermally conductive element has regions differing in thermal conductivity.

9. The tool component according to claim 8, wherein the regions increase in thermal conductivity away from the abrasive element.

10. The tool component according to claim 8, wherein the thermally conductive element comprises a plurality of alternating regions differing in thermal conductivity.

11. The tool component according to claim 10, wherein the alternating regions are first regions of a material having a thermal conductivity greater than the thermal conductivity of the abrasive element, the first regions alternating with second regions of a material having a thermal conductivity the same as or lower than the thermal conductivity of the abrasive element.

12. The tool component according to claim 10, wherein the alternating regions are in strip form.

13. The tool component according to claim 10, wherein the alternating regions are in spiral or concentric ring form.

14. A method of cutting or turning a material, the method comprising the steps of:
   providing a cutting edge or point of a tool component, wherein the tool component includes an abrasive element presenting a cutting edge or joint, and a thermally conductive element having a thermal conductivity greater than a thermal conductivity of the abrasive element, the thermally conductive element being in thermal contact with the abrasive element so as to conduct heat generated at the cutting edge or point away from the cutting edge or point, wherein the abrasive element is PCBN and the thermally conductive element is either CVD diamond or PCD;
   causing relative movement between the cutting point or edge and the material; and
   advancing the cutting edge or point into the material.

15. The method according to claim 14, wherein the material contains iron, nickel, or cobalt.

16. A tool component comprising:
   an abrasive element presenting a cutting edge or point; and
   a thermally conductive element having a thermal conductivity greater than a thermal conductivity of the abrasive element, the thermally conductive element being in thermal contact with the abrasive element so as to conduct heat generated at the cutting edge or point away from the cutting edge or point, wherein the abrasive element is PCD and the thermally conductive element is CVD diamond.

17. The tool component according to claim 16, wherein the thermal conductivity of the thermally conductive element exceeds 120 W/m.° K.

18. The tool component according to claim 16, wherein the thermally conductive element is a layer in thermal contact with a surface of the abrasive element.

19. The tool component according to claim 18, wherein the abrasive element has a surface leading to the cutting edge or point and the thermally conductive element is bonded to the surface of the abrasive element leading away from the cutting edge or point.

20. The tool component according to claim 18, wherein the abrasive element has a first surface leading to the cutting edge or point and a second surface which is opposite the first surface and the thermally conductive element is bonded to the second surface of the abrasive element.

21. The tool component according to claim 18, wherein the abrasive element and thermally conductive element both have a layer form.

22. The tool component according to claim 16, wherein the abrasive element is an insert located in a recess in the thermally conductive element.

23. The tool component according to claim 16, wherein the thermally conductive element has regions differing in thermal conductivity.

24. The tool component according to claim 23, wherein the regions increase in thermal conductivity away from the abrasive element.

25. The tool component according to claim 23, wherein the thermally conductive element comprises a plurality of alternating regions differing in thermal conductivity.

26. The tool component according to claim 25, wherein the alternating regions are first regions of a material having a thermal conductivity greater than the thermal conductivity of the abrasive element, the first regions alternating with second regions of a material having a thermal conductivity the same as or lower than the thermal conductivity of the abrasive element.

27. The tool component according to claim 25, wherein the alternating regions are in strip form.

28. The tool component according to claim 25, wherein the alternating regions are in spiral or concentric ring form.

29. A method of cutting or turning a material, the method comprising the steps of:
   providing a cutting edge or point of a tool component, wherein the tool component includes an abrasive element presenting a cutting edge or joint, and a thermally conductive element having a thermal conductivity greater than a thermal conductivity of the abrasive element, the thermally conductive element being in thermal contact with the abrasive element so as to conduct heat generated at the cutting edge or point away from the cutting edge or point, wherein the abrasive element is PCD and the thermally conductive element is CVD diamond;
   causing relative movement between the cutting point or edge and the material; and
   advancing the cutting edge or point into the material.

30. The method according to claim 29, wherein the material contains iron, nickel, or cobalt.

* * * * *